United States Patent
Eriksson et al.

(10) Patent No.: US 9,028,367 B2
(45) Date of Patent: May 12, 2015

(54) METHOD FOR OPTIMISED LAUNCH OF A VEHICLE

(75) Inventors: Anders Eriksson, Torslanda (SE); Johan Bjernetun, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/123,123

(22) PCT Filed: May 30, 2011

(86) PCT No.: PCT/EP2011/002665
§ 371 (c)(1),
(2), (4) Date: May 30, 2011

(87) PCT Pub. No.: WO2012/163369
PCT Pub. Date: Dec. 6, 2012

(65) Prior Publication Data
US 2014/0302966 A1    Oct. 9, 2014

(51) Int. Cl.
*B60W 10/11* (2012.01)
*B60W 10/02* (2006.01)
(Continued)

(52) U.S. Cl.
CPC .............. *B60W 10/11* (2013.01); *B60W 10/02* (2013.01); *B60W 10/06* (2013.01); *B60W 30/18027* (2013.01); *Y02T 10/47* (2013.01);
(Continued)

(58) Field of Classification Search
CPC ..... B60W 10/11; B60W 10/02; B60W 10/06; B60W 30/18027; F16H 59/52; F16H 2061/0018; F16H 2061/0216; F16H 59/30; F02D 41/021; F02D 41/022; F02D 41/0047; F02D 41/023

USPC ..................... 477/115, 120, 100, 900; 701/65
See application file for complete search history.

(56) References Cited

U.S. PATENT DOCUMENTS 4,454,854 A    6/1984   Otobe et al.
6,394,931 B1 *  5/2002   Genise ........................... 477/97
(Continued)

FOREIGN PATENT DOCUMENTS

DE   10 2009 050831 A1   5/2010
EP        1559893 A1     8/2005
(Continued)

OTHER PUBLICATIONS

International Search Report (Jul. 16, 2012) for corresponding International Application PCT/EP2011/002665.

*Primary Examiner* — Roger Pang
(74) *Attorney, Agent, or Firm* — WRB-IP LLP

(57) ABSTRACT

A method for optimized launch of a vehicle is provided wherein a driveline of the vehicle at least includes an engine, an automatic transmission, a system for exhaust gas recirculation, which are controlled by a driveline management system, wherein the management system is able to determine the mass of the vehicle, and whereby a launching gear of the transmission is calculated dependent at least on the determined mass of the vehicle, whereby a launching gear is chosen dependent of the power loss caused by the EGR and wherein the power loss caused by the EGR is determined, the available power to launch the vehicle is determined, and the launching gear is recalculated dependent of the available power, and selecting said recalculated launching gear before launch of the vehicle, launch the vehicle with the recalculated launching gear.

8 Claims, 1 Drawing Sheet

(51) Int. Cl.
| | |
|---|---|
| *B60W 10/06* | (2006.01) |
| *B60W 30/18* | (2012.01) |
| *F02D 41/02* | (2006.01) |
| *F02D 41/00* | (2006.01) |
| *F16H 59/52* | (2006.01) |
| *F16H 59/74* | (2006.01) |
| *F16H 61/02* | (2006.01) |

(52) U.S. Cl.
CPC ............... *B60W2510/0241* (2013.01); *B60W 2510/0657* (2013.01); *B60W 2530/10* (2013.01); *B60W 2710/1005* (2013.01); *F02D 41/0215* (2013.01); *F02D 41/022* (2013.01); *F02D 41/0047* (2013.01); *F02D 2200/1004* (2013.01); *Y02T 10/54* (2013.01); *B60Y 2400/442* (2013.01); *F16H 59/52* (2013.01); *F16H 2059/743* (2013.01); *F16H 2061/023* (2013.01); *Y10S 477/90* (2013.01)

(56) References Cited

U.S. PATENT DOCUMENTS

| | | | | |
|---|---|---|---|---|
| 6,412,361 | B1* | 7/2002 | Wolf et al. | 74/336 R |
| 6,519,522 | B1* | 2/2003 | Wolf et al. | 701/61 |
| 6,953,410 | B2* | 10/2005 | Wheeler et al. | 475/115 |
| 7,707,821 | B1 | 5/2010 | Legare | |
| 2002/0165063 | A1* | 11/2002 | Ito | 477/37 |
| 2004/0106498 | A1* | 6/2004 | Badillo et al. | 477/109 |

FOREIGN PATENT DOCUMENTS

| | | |
|---|---|---|
| WO | 03038314 A1 | 5/2003 |
| WO | 03058093 A1 | 7/2003 |

* cited by examiner

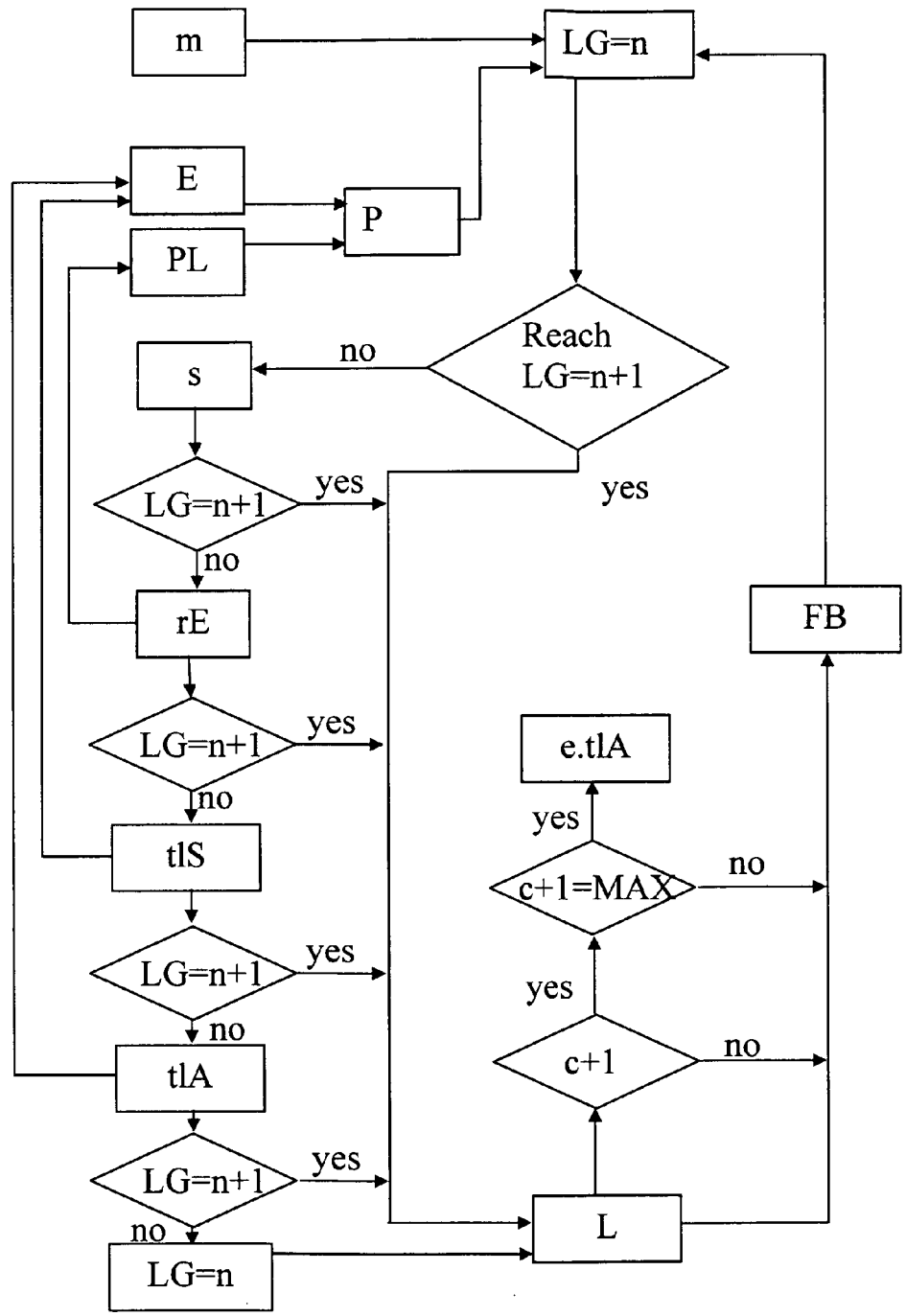

METHOD FOR OPTIMISED LAUNCH OF A VEHICLE

BACKGROUND AND SUMMARY

The present invention relates to the field of drivetrains of vehicles, and more particularly, to a method for controlling and improving a launch of a vehicle, especially a utility vehicle provided with an exhaust gas recirculation (EGR).

In vehicles provided with an EGR today, a lower launching gear is selected when the EGR is activated, in comparison when the EGR is not activated. The lower launching gear is selected because of the power loss caused by the EGR. Thereby is an extra gear change necessary to launch the vehicle and reach a travelling speed. The extra gear change reduces the comfort and increases the stress and wear on the parts in the drivetrain, and is also not wanted in an environmental perspective.

Further, the power loss caused by the EGR has shown to be individual for each EGR, wherein a lower starting gear is chosen in cases in which it standard launching gear would have been possible.

There is, thus, a need for improvement, to keep the environmental benefits of the EGR without having the disadvantages of the lower launching gear.

It is desirable to provide an inventive method for launch of a vehicle with an exhaust gas recirculation (EGR) where the previously mentioned problems are partly avoided.

The method is applicable on a vehicle with a driveline, which at least comprises an engine, an automatic transmission and a system for exhaust gas recirculation (EGR). The driveline is controlled by a driveline management system (MS). The MS can comprise several different management systems, such as an engine management system and a transmission management system. The main functions of the vehicle are controlled by the MS, wherein for the present application, the MS has access to or is able to determine the mass of the vehicle. The MS uses the information about the mass of the vehicle to calculate a launching gear of the transmission. Systems for determining the mass of a vehicle is well know, such systems could be determining the mass of the vehicle during launch of the vehicle, or be mass sensor based systems or be any other system for determining the mass of the vehicle and from that information calculate a launching gear at least dependent of said determined mass.

The inventive method is characterised in, that a launching gear is chosen dependent of the power loss caused by the EGR. This is done, in that
the power loss caused by the EGR is determined,
the available power to launch the vehicle is determined, and
the launching gear is recalculated dependent of said available power, and
selecting said recalculated launching gear before launch of the vehicle.
launch the vehicle with said recalculated launching gear engaged.

The system for EGR sends a signal comprising information of how much power that is lost when EGR is enabled during launch of the vehicle. The power loss is however dependent of the launching gear used during the launch, i.e. the speed of the engine, and the engine power, whereby the MS first determines the available power from the engine, for each possible launching gear. The MS then performs the same calculation operations for the available power when the EGR power loss for the individual gears is subtracted, wherein the highest gear possible with the FOR power loss subtracted is chosen. Whereby said recalculated launching gear is selected and engaged and the vehicle can be launched therewith.

Due to the inventive method the correct launching gear can be selected already before the first launch. Further, instead of consequently selecting a lower gear than calculated, the correct gear can always be chosen. Due to the presented inventive method, the driving comfort is increased and the vehicle is driven in a more environmental friendly manner, because less gear changes have to be made to reach the desired travel speed. A further advantage with a high launching gear is that the wear on the drivetrain will be reduced, since the vehicle can reach its travelling speed with less gear changes. The method further have the advantage, that the vehicle will be able to be launched during conditions, at which the available power to launch the vehicle normally would not be sufficient, such as during fully loaded vehicle launches in uphill slopes.

Further advantages are achieved by implementing one or several of the features of the dependent claims. In a first advantageous embodiment of the inventive method, an engagement of a starting clutch is controlled dependent of the power loss, which is caused by the EGR and said selected launching gear. By having a longer engagement time of the clutch, a higher gear than otherwise can be selected as launching gear for the vehicle.

In another advantageous embodiment of the invention the method further comprises: reducing the EGR during a slippage of said starting clutch, wherein the recirculation is not reduced more than to just allow launching the vehicle from a higher starting gear than otherwise. This measure is meant to be a complement, if the calculated available power is just below the limit for using a specific starting gear, by reducing the recirculation and thereby also the loss caused thereby, more power will be available to launch the vehicle.

By reducing the EGR more power is available, wherein the vehicle might be able to launch in a higher gear. The benefits of a higher gear compensates for the reduction of the EGR, such that the exhaust gas regulations still are fulfilled. Further, the reduction of the EGR is performed during such a short period, that the effects thereof in the sense of emissions is negligible, especially since the use of a higher launching gear can compensate for the increase in emissions, such that the emissions from the whole launching procedure is reduced.

In another advantageous embodiment of the invention, the method further comprises a step of reducing the EGR during the whole launch of the vehicle. The launch of the vehicle is defined as the time interval from the starting of the engagement of the starting clutch up to the first gear change after initiated launch. By reducing the EGR more power is available, wherein the vehicle might be able to launch in a higher gear. The benefits of a higher gear compensates for the reduction of the EGR, such that an exhaust gas regulations still is fulfilled. And the reduction of the EGR is performed during such a short period, that the effects thereof in the sense of emissions is negligible.

The method further comprises a step of evaluating the launch of the vehicle, wherein the launch of the vehicle is evaluated in respect of how the expected speed, acceleration, clutch engagement, and gear changes corresponds to the actual launching procedure. After every launch of the vehicle, the lapse of the launch is evaluated and compared to the expected lapse of the launch, wherein any deviations from the expected lapse of the launch are used to optimise the next launch of the vehicle.

In an advantageous variant of the inventive method, the method further comprises a first and a second emergency launch measure, wherein a first emergency measure is an increase of a torque limit of the engine set by a smoke limiter.

The smoke limiter is set to minimize the smoke out of the exhaust pipes of the vehicle. By increasing this torque limit during the launch or parts of the launch, more power is available from the engine of the vehicle, wherein a launch of the vehicle is made possible. After the launching procedure, the torque limit set by the smoke limiter is adjusted to its normal value.

A second emergency measure is to increase a torque limit of the engine set by an axle protection limit. The torque limit is set to not overload the axle of the vehicle. The axle of the vehicle is dimensioned for a certain load and lifetime, wherein a safety margin thereby is included. This torque limit is however set with a margin, such that a higher load can be applied to the axle without any harm made. However, this can only be done a limited number of times and during a limited time period.

The method steps of increasing the torque limit of the engine set by the axle protection limit and/or the smoke limiter is an emergency measure, which is to use if the vehicle is not able to start at the lowest gear. Such an emergency might for example occur if the vehicle is heavily loaded and has to be started in an uphill slope.

In order to protect the axle of the vehicle, the method can further comprise the step of counting the number of times the torque limit of the axle is increased and thereafter exceeded during the launching procedure. Wherein the method step of increasing the torque limit of the axle is permanently eliminated from the method when said torque limit is increased and exceeded a predefined number of times. By introducing this counter and a maximum number of times the torque limit of the axle is allowed to be temporarily increased and exceeded, a long life time of the axle can still be assured and the safety of the vehicle is maintained.

DESCRIPTION OF THE DRAWINGS

The present invention will now be described in detail with reference to the only FIGURE, which shows a flowchart of an implementation of the inventive method. In the following only one embodiment of the invention is shown and described, simply by way of illustration of one mode of carrying out the invention.

DETAILED DESCRIPTION

The invention is not limited to the specific flowchart presented, but includes all variations within the scope of the present claims. The internal sequence of the steps for arriving at the launching gear can of course be varied within the scope of the invention and according to the demands of the vehicle and regulations.

The method is applicable for launching a vehicle having a driveline, which at least comprises an engine, an automatic transmission and a system for exhaust vas recirculation (EGR). The driveline is controlled by a driveline management system (MS). The MS can possibly comprise several management systems, such as an engine management system and a transmission management system and which are communicating and interact with each other. The main functions of the vehicle are controlled by the MS, wherein for the present application, the MS has access to or is able to determine the mass of the vehicle. It is the MS that executes the inventive method.

The MS uses the information about the mass of the vehicle to calculate a launching gear of the transmission. Systems for determining the mass of a vehicle is well know, such systems could be determining the mass of the vehicle during launch of the vehicle, or be mass sensor based systems or be any other system for determining the mass of the vehicle and from that information calculate a launching gear at least dependent of said determined mass.

The method starts by a launching gear. $LG=n$ is determined dependent of the mass m of the vehicle and the power P, which is available for launch of the vehicle. The power P is the available power to launch the vehicle, especially with the power losses PE caused by EGR subtracted from the power E available from the engine. Thereby is the highest possible launching gear selected for launching the vehicle, in comparison if the launching gear is determined from the power E available from the engine and consequently use a gear lower to compensate for the power losses PL caused by the EGR. Thereby, will there always be a more efficient launch of the vehicle.

However, there are ways to increase the available power P or allow the use of a higher launching gear with the same available power P. Hence, if a higher launching gear $LG=n+1$ is available, these are stepwise implemented. Wherein the order of implementation shown in the flowchart is a preferred embodiment, wherein alternative implementation orders are just as suitable, depending of the priority of the different functions in the MS.

However, in this shown preferred embodiment, the slippage s of the clutch is firstly adjusted, such that the vehicle is able to launch with a higher launching gear than determined. By adjusting the slippage s of the clutch such that the clutch slips under a longer period of time, the vehicle might be launched with less available power. The slippage s of the clutch is obviously adjusted with reasonable limits, wherein the difference in the slippage s of the clutch is essentially unnoticeable for a driver. If the adjustment of the slippage s of the clutch enables a launch of the vehicle on a higher launching gear n+1, the vehicle can be launched without any further adjustments, if not, another adjustment is performed.

As a second adjustment rE, the recirculation of the EGR can be reduced, wherein the power loss EL caused thereby is reduced and thereby more power P will become available. If the adjustment rE of the EGR of the clutch enables a launch of the vehicle on a higher launching, gear $LG=n+1$, the vehicle can be launched with the launching gear $LG=n+1$.

If the launching gear is 0, i.e. the vehicle is not able to launch, further emergency adjustments must be made in order to allow the vehicle to launch at all. As an emergency adjustment tIS, tIA, a torque limit in the engine set by a smoke limiter (tIS) and/or torque limit in the engine, set by an axle protection limit (tIA) can temporary be increased during a. part of the launch or the whole launch of the vehicle. By increasing one or both of said torque limits, more power E from the engine might be available and a higher launching gear L=n+1 n might be reached, due to the thereby increased available power P, i.e. a launch of the vehicle is possible on the first gear.

However, to maintain the safety and the expected life time of the axle, the torque limit for the axle tIA must however not be increased and exceeded more than a predefined number of times. Hence, for each time the torque limit for the axle tIA is increased and thereby also exceeded during launch of the vehicle a counter c trigged c+1, wherein when the counter reaches the predefined number of times c+1=MAX, the possibility to increase the torque limit tIA is excluded e.tIA from the method.

If all said adjustments still are not enough in order to be able to launch with said gear $LG=n+1$ then the MS selects and engages gear $LG=n$ for the launch.

When it is determined that the optimum, i.e. highest available, launching gear is found and selected the launching L of the vehicle takes place. During the launch the vehicle is monitored, wherein the thereby detected values of the launch is compared with the expected values of the launch, wherein deviations from the expected values of the launch is given as feedback FB to be used during the next launch of the vehicle. Especially the launching time of the vehicle is monitored, such that if the time to launch the vehicle is longer than expected, the feedback FB is used by the MS to increase the precision of the method for the next start.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. Method for optimised launch of a vehicle, wherein a driveline of the vehicle at least comprises an engine, an automatic transmission, a system for exhaust gas recirculation (EGR), which are controlled by a driveline management system (MS), wherein the management system is able to determine the mass (m) of the vehicle, and whereby a launching gear of the transmission is calculated dependent at least or the determined mass (m) of the vehicle, comprising choosing a launching gear dependent on power loss caused by the EGR including
    determining the power loss caused by the EGR,
    determining an available power to launch the vehicle,
    recalculating the launching gear dependent on available power,
    selecting the recalculated launching gear before launch of the vehicle,
    launching the vehicle with the recalculated launching gear engaged.

2. Method according to claim 1, comprising controlling an engagement of a starting clutch dependent of the power loss caused by the EGR and said selected launching gear.

3. Method according to claim 1, comprising reducing the EGR during to slippage of said starting clutch.

4. Method according to claim 1, comprising reducing the EGR during the whole launch of the vehicle.

5. Method according to claim 1, comprising evaluating the launch of the vehicle.

6. Method according to claim 1, comprising increasing a torque limit of the engine set by a "smoke limiter".

7. Method according to claim 1, comprising increasing a torque limit of the engine set by an axle protection limit.

8. Method according to claim 7, comprising counting the number of times the torque limit of the axle is increased and exceeded, and eliminating the possibility to increase the torque limit of the axle, when the torque limit is increased and has exceeded a predefined number of times.

* * * * *